United States Patent
Bassett, Jr.

[15] 3,685,311
[45] Aug. 22, 1972

[54] EVAPORATOR-BLOWER PACKAGE
[72] Inventor: Arthur T. Bassett, Jr., Dayton, Ohio
[73] Assignee: General Motors Corporation, Detroit, Mich.
[22] Filed: June 1, 1972
[21] Appl. No.: 148,524

[52] U.S. Cl. ..................62/244, 62/262, 62/263, 62/239
[51] Int. Cl. ..............................B60h 3/04
[58] Field of Search..............62/244, 262, 263, 239

[56] References Cited
UNITED STATES PATENTS

| 3,007,323 | 11/1961 | Inilbington | 62/244 |
| 3,449,924 | 6/1969 | Sudmerer | 62/244 |

*Primary Examiner*—William J. Wye
*Attorney*—W. S. Pettigrew, J. C. Evans and K. H. MacLean, Jr.

[57] ABSTRACT

A cooling package for an automobile passenger compartment including a housing which encloses an evaporator core and a motor driven fan having rotatable air outlets to permit alternate horizontal or vertical mounting of the package within the automobile.

3 Claims, 4 Drawing Figures

PATENTED AUG 22 1972 3,685,311

INVENTOR.
Arthur J. Bassett, Jr.
BY
K. H. MacLean, Jr.
ATTORNEY

EVAPORATOR-BLOWER PACKAGE

This invention relates to an automobile air conditioner.

The present invention includes a thin-walled housing which encloses an evaporator core and a motor driven blower fan. The housing is supported within the automobile passenger compartment and air is drawn into the housing, through the evaporator core and discharged back into the passenger compartment by the fan. Heat transferred to the evaporator form the air is discharged to atmosphere by a compressed refrigerant air conditioning system. This type system includes an engine driven refrigerant compressor, a condensor, expansion means and an evaporator.

A convenient place to mount the cooling package within the passenger compartment is behind or below the dashboard. Because of space limitations which vary with differing body styles, it is desirable to provide a cooling package which can be mounted either in a horizontal or a vertical position. The present invention features a housing with rotatable air outlets which are swiveled to accommodate either horizontal or vertical mounting as available space under and behind the dashboard dictates.

Therefore, an object of the invention is the provision of a cooling package for an automobile passenger compartment having rotatable air outlets adjustable for either horizontal or vertical mounting of the package.

A further object of the invention is the provision of a cooling package for an automobile passenger compartment including an evaporator core and an electric motor powered fan supported in a housing having adjustable air outlets about the fan outlet which rotate to accommodate horizontal or vertical mounting of the housing.

Further objects and advantages of the present invention will be apparent from the following detailed description, reference being had to the accompanying drawings in which a preferred embodiment is clearly illustrated.

Figure 1:
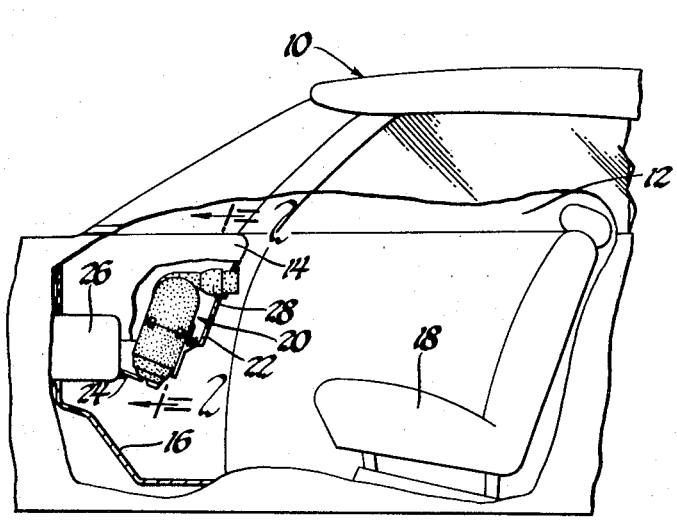
FIG. 1 is a partial side view of an automobile broken away to reveal the forward portion of the passenger compartment with the subject cooling package mounted in a vertical position.
Figure 3:
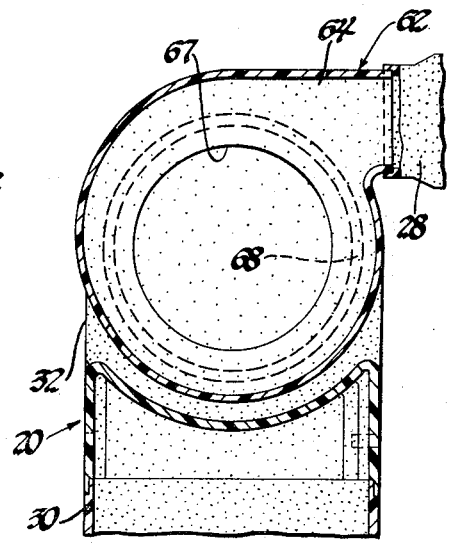
Figure 2:
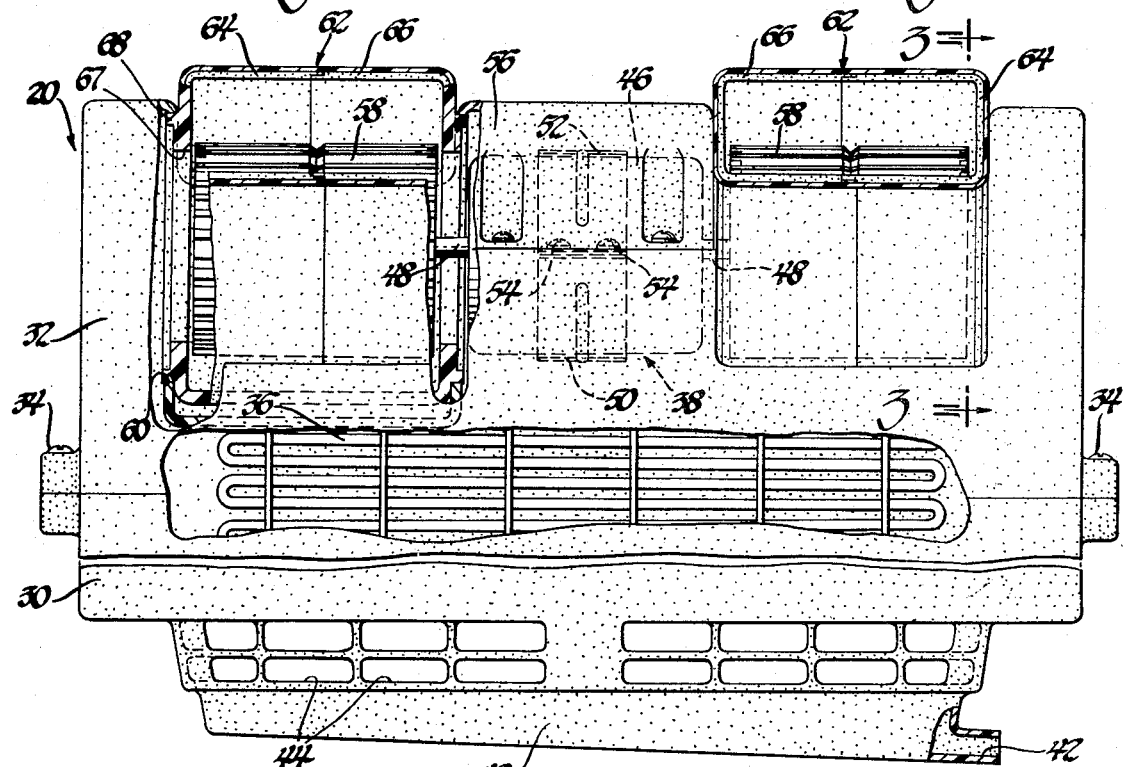
FIG. 2 is a front elevational view of the cooling package taken along section 2—2 in FIG. 1 and looking in the direction of the arrows.
Figure 4:
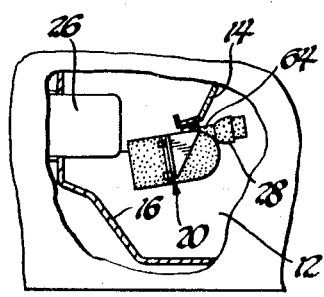

FIG. 3 is a vertical section view of the cooling package taken along section line 3—3 in FIGURE 2 and looking in the direction of the arrows; and FIG. 4 is a view similar to FIGURE 1 showing the cooling package mounted in a horizontal position. In FIG. 1 of the drawings, an automobile 10 is illustrated. The side of the automobile is broken away to reveal the passenger compartment 12 which includes a dashboard 14, fire wall 16 and front seat 18. A cooling package 20 is mounted behind the front 22 of dashboard 14 by a bracket 24 extending from the automobile heater duct 26. An air discharge 28 extends rearward through a hole in the front 22 of dashboard 14 to distribute cool air into the passenger compartment 12.

The cooling package 20 is shown in more detail in FIGS. 2 and 3. The cooling package includes a thin wall housing formed by a first portion 30 and a second portion 32 which are joined together by fasteners 34. The first and second portions 30 and 32 enclose an interior space containing an evaporator core 36 and a motor driven fan assembly 38. A sump portion 40 is formed in one end of the first housing portion 30 to collect water as the air is dehumidified by passing through the cooled evaporator core 36. An outlet fitting 42 on the sump portion 40 is connected to a rubber hose (not shown) for draining water through the fire wall and to the ground. A plurality of air inlet openings 44 are also provided in the first housing portion 30 for the passage of air to evaporator core 36.

The motor driven fan assembly 38 is centrally supported by the second housing portion. The fan assembly 38 includes an electric motor 46 with its shaft 48 axially extending from both its ends. The motor 46 is rigidly secured in the second housing portion 32 by two semicircular straps 50 and 52 which encircle the motor and are fastened to portion 32 by screws 54. A cover 56 encloses the motor within the interior of housing portion 32 which prevents the entry of air.

Two squirrel cage centrifugal fans 58 are mounted on either end of the motor shaft 48 for rotation together. Air is drawn axially into the centers of fans 58 through inlet openings 60 in housing 30. Air flows radially through fan 58 and is diverted into a tangential direction by an air outlet scroll 62 which is formed by joined members 64 and 66. The air outlet scroll 62 has a cylindrical portion surrounding fan 58. An air directing discharge portion 64 extends tangentially from the fan 58 to divert air flow in a desired direction.

The air outlet scroll 62 encircles fan 58 and is pivotal within the housing portion 32. MOvement of the discharge portion 64 in alternate directions enables the cooling package 20 to be mounted either horizontally or vertically in the automobile passenger compartment. The outlet scroll 62 has circular openings 67 formed in either end of its cylindrical portion and circular ridges 68 which encircle the openings 67. The ridges 68 extend axially from the cylindrical portion and project through openings 60. This permits limited angular movement of scroll 62 about the axis of fan 58 and causes the air discharge portion 64 to direct air in alternate directions.

In FIG. 4, of the drawings, a side view of an automobile is broken away to reveal passenger compartment 12, dashboard 14 and firewall 16. The cooling package 20 is mounted in a horizontal position beneath the dashboard 14. The scroll 62 is rotated from its position in FIGURE 1 to cause discharge duct 28 and discharge portion 64 of the scroll 62 to point rearward into the passenger compartment. Thus, with the outlet of the coolant package rotatable, the cooling package can be mounted horizontally or vertically in different automobiles having differing space limitations under the dashboard.

While the embodiment of the present invention as herein described constitutes a preferred form, it is to be understood that other forms might be adapted.

What is claimed is as follows:

1. An air conditioning package for cooling an automobile passenger compartment having a housing which encloses an evaporator and a motor driven fan and which has a pivotal air outlet for permitting either horizontal or vertical mounting of the housing: a thin walled housing including first and second portions fastened together to enclose an interior space; said first housing portion having air inlet openings therein and means supporting said evaporator in said interior apace adjacent said air inlet openings for causing air to flow through said evaporator; means including said second housing portion supporting said motor driven fan within said interior space; air outlet means including a cylindrical portion which encircles said fan and is pivotally mounted in said second housing portion and a tubular portion extending tangentially form said cylindrical portion for directing air flow from said fan in alternate directions when said cylindrical portion is rotated in said second housing portion thus enabling said package to be alternately horizontally and vertically mounted.

2. An air conditioning package for cooling an automobile passenger compartment having a housing which encloses an evaporator and a motor driven fan and which has a pivotal air outlet for permitting either horizontal or vertical mounting of the housing: a thin walled housing including first and second portions fastened together to enclose an interior space; said first housing portion having air inlet openings therein and means supporting said evaporator in said interior space adjacent said air inlet openings for causing air to flow through said evaporator; means including said second housing portion supporting said motor driven fan within said interior space; air outlet means including a cylindrical portion which encircles said fan and tubular portion extending tangentially from said cylindrical portion for directing air flow from said fan; said cylindrical portion having circular air inlet openings axially through both ends aligned with openings in said second housing portion for passing air from said interior space to said fan; a ridge encircling the inlet openings in said cylindrical portion which extend axially from its ends and are adapted to project through the openings in said second housing portion thus supporting said cylindrical portion to permit limited angular rotation of said air outlet means with respect to said second housing portion whereby air flow from said tubular portion can be directed in alternate directions to enable alternate horizontal and vertical mounting of said package.

3. An air conditioning package for cooling an automobile passenger compartment having a housing which encloses an evaporator and a motor driven fan and which has a pivotal air outlet for permitting either horizontal or vertical mounting of the housing: a thin walled housing including first and second portions fastened together to enclose an interior space; said first housing portion having air inlet openings therein and means supporting said evaporator in said interior space adjacent said air inlet openings for causing air to flow through said evaporator; means including said second housing portion supporting said motor driven fan within said interior space; drain means including an opening in said first housing portion adjacent said inlet openings for discharging water from said interior space; air outlet means including a cylindrical portion which encircles said fan and tubular portion extending tangentially from said cylindrical portion for directing air flow from said fan; said cylindrical portion having circular air inlet openings axially through both ends aligned with openings in said second housing portion for passing air from said interior space to said fan; a ridge encircling the inlet openings in said cylindrical portion which extend axially from its ends and are adapted to project through the openings in said second housing portion thus supporting said cylindrical portion to permit limited angular rotation of said air outlet means with respect to said second housing portion, whereby air flow from said tubular portion can be directed in alternate directions to enable alternate horizontal and vertical mounting of said package.

* * * * *